United States Patent
Bailey et al.

[11] Patent Number: 5,924,670
[45] Date of Patent: *Jul. 20, 1999

[54] ADAPTIVELY TUNED ELASTOMERIC VIBRATION ABSORBER

[75] Inventors: Donald C. Bailey, McCall, Id.; Chan Park, Granada Hills, Calif.; Andreas H. von Flotow, Hood River, Oreg.; William Jensen, Apex, N.C.

[73] Assignee: Applied Power Inc., Butler, Wis.

[ * ] Notice: This patent is subject to a terminal disclaimer.

[21] Appl. No.: 08/987,674

[22] Filed: Dec. 9, 1997

[51] Int. Cl.$^6$ ..................................... F16M 13/00
[52] U.S. Cl. ........................................... 248/550; 188/380
[58] Field of Search ..................... 248/650, 638, 248/654, 557; 188/380, 328, 329

[56] References Cited

U.S. PATENT DOCUMENTS 4,346,793  8/1982  Fuse et al. ........................... 248/550 X
5,456,341  10/1995  Garnjost et al. ..................... 248/550 X
5,695,027  12/1997  Von Flotow et al. ................ 248/550 X

*Primary Examiner*—Ramon O. Ramirez
*Attorney, Agent, or Firm*—Quarles & Brady LLP

[57] ABSTRACT

An apparatus for reducing vibration has a mount for attaching to a vibrating body, such as the frame of an aircraft. A plate is spaced from the mount with a mass there between. A first elastomeric ring is compressed between the mass and the mount, and a second elastomeric ring is compressed between the mass and the plate. The rings act as a spring having a stiffness that defines a resonant frequency at which the mass oscillates. Vibration in the body is reduced by the mass movement absorbing vibrational energy and the energy absorption is maximized when the mass resonates at the vibration frequency. A controller senses body vibration and operates a mechanism that alters the spacing between the mount and the plate thereby adjusting the spring stiffness. The stiffness of the spring is changed until the resonant frequency of the mass is tuned to the vibration frequency of the body.

16 Claims, 3 Drawing Sheets

ADAPTIVELY TUNED ELASTOMERIC VIBRATION ABSORBER

BACKGROUND OF THE INVENTION

The present invention relates to devices for countering vibration in structural members, such as the frame of an aircraft; and particularly to such devices which can be dynamically tuned to adapt performance to changes in vibration frequency.

Aircraft engines can induce significant vibration into the airframe. In propeller powered planes, the propeller blades produce air pressure pulses which strike external surfaces thereby causing a time periodic vibration of the structure, at about 100 Hz for example, which vibration is transferred to other structural members of the airframe. Jet engines also produce vibration in supporting members. If left unchecked, the induced vibrations create objectionable noise in the aircraft cabin, and may result in serious fatigue of the airframe.

As a consequence vibration absorbers are attached to structural members throughout the aircraft. For example, the Fokker 50 turbo-prop airplane carries 150 frame-mounted absorbers. These devices typically are a simple spring-mass system in which a mass is attached to the airframe by a resilient member that acts as a spring that allows the mass to oscillate. Elastomeric pads and metal cantilevers have been employed as the spring. The spring-mass system is fixedly tuned to resonate at the frequency of common vibration in the structural member of the airframe to which the absorber is attached and thus optimally absorbs the vibration energy at that frequency. The absorber has a large mechanical impedance at resonance which is due mostly to a large quality factor Q. Absorption (mechanical impedance) at other frequencies diminishes as a function of the deviation from the resonant frequency.

A drawback of fixedly tuned absorbers is that the frequency of airframe vibration varies with engine speed, especially with jet powered aircraft. Although the absorber may be tuned to the vibration frequency which occurs at the nominal cruising speed of the aircraft, less that optimal vibration absorption occurs at other speeds. In addition, the tuning of elastomeric type absorbers changes with the age and temperature of the resilient material.

Therefore, it is desirable to provide an absorption system which is dynamically adaptive to variation of the vibration frequency and other factors.

SUMMARY OF THE INVENTION

An object of the present invention is to provide a system for absorbing time periodic vibrations in a structural member wherein the system is autonomously capable of adapting to different vibration frequencies.

Another object is to provide a vibration absorber that has a mass-spring system with a resonant frequency which is adjusted dynamically to track changes in the frequency of the vibration in the structural member.

These objectives are fulfilled by a vibration absorber that has a mount for attaching to the vibrating body. A mass is coupled to the mount by a spring enabling the mass to oscillate with respect to the mount. The spring has a stiffness which defines a resonant frequency at which the mass oscillates and a device adjusts the spring stiffness in response to a control signal, thereby altering the resonant frequency.

A first sensor produces a signal indicating vibration of the body. A control circuit receives the sensor signal and produces the control signal which causes the mechanism to adjust the spring stiffness until the resonant frequency is tuned to the frequency of vibration.

In the preferred embodiment, the mass is supported between the mount and a load plate by a pair of elastomeric rings which allow the mass to oscillate in a plane parallel to the mount and the load plate. The elastomeric rings act as the spring and the spring stiffness is a function of pre-load compression of the rings. A motor driven mechanism varies the spacing between the load plate and the mount, thus changing the pre-load compression of the elastomeric rings.

DETAILED DESCRIPTION OF THE INVENTION

Figure 1:
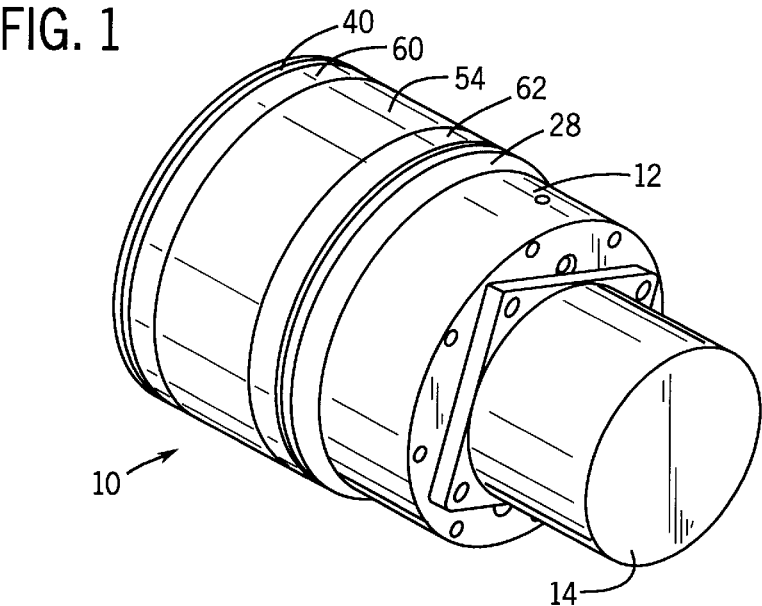
FIG. 1 is an isometric view of a vibration absorber according to the present invention with a cover removed.
Figure 2:
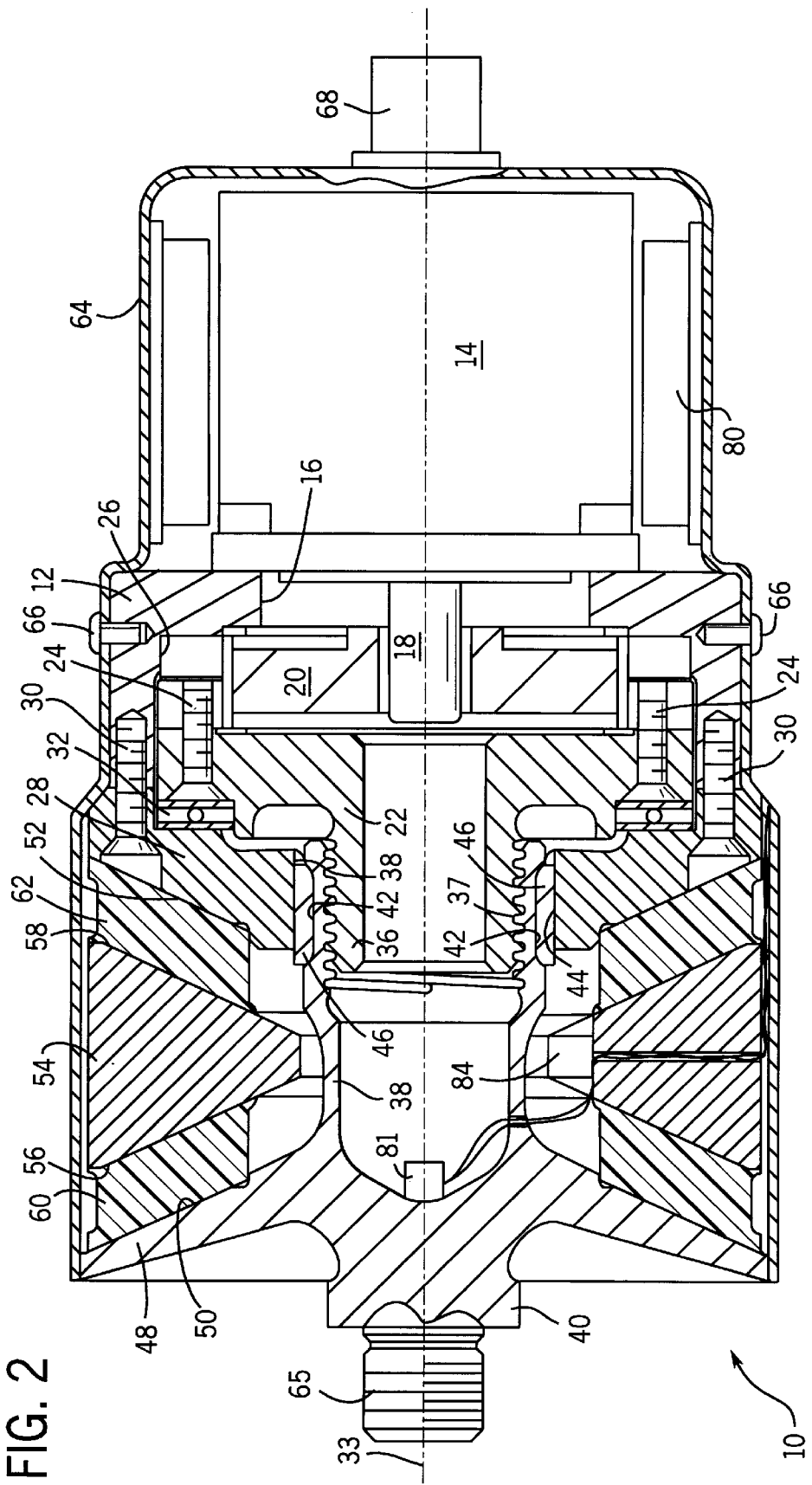
FIG. 2 is longitudinal cross sectional view through the vibration absorber with the cover in place.
Figure 3:
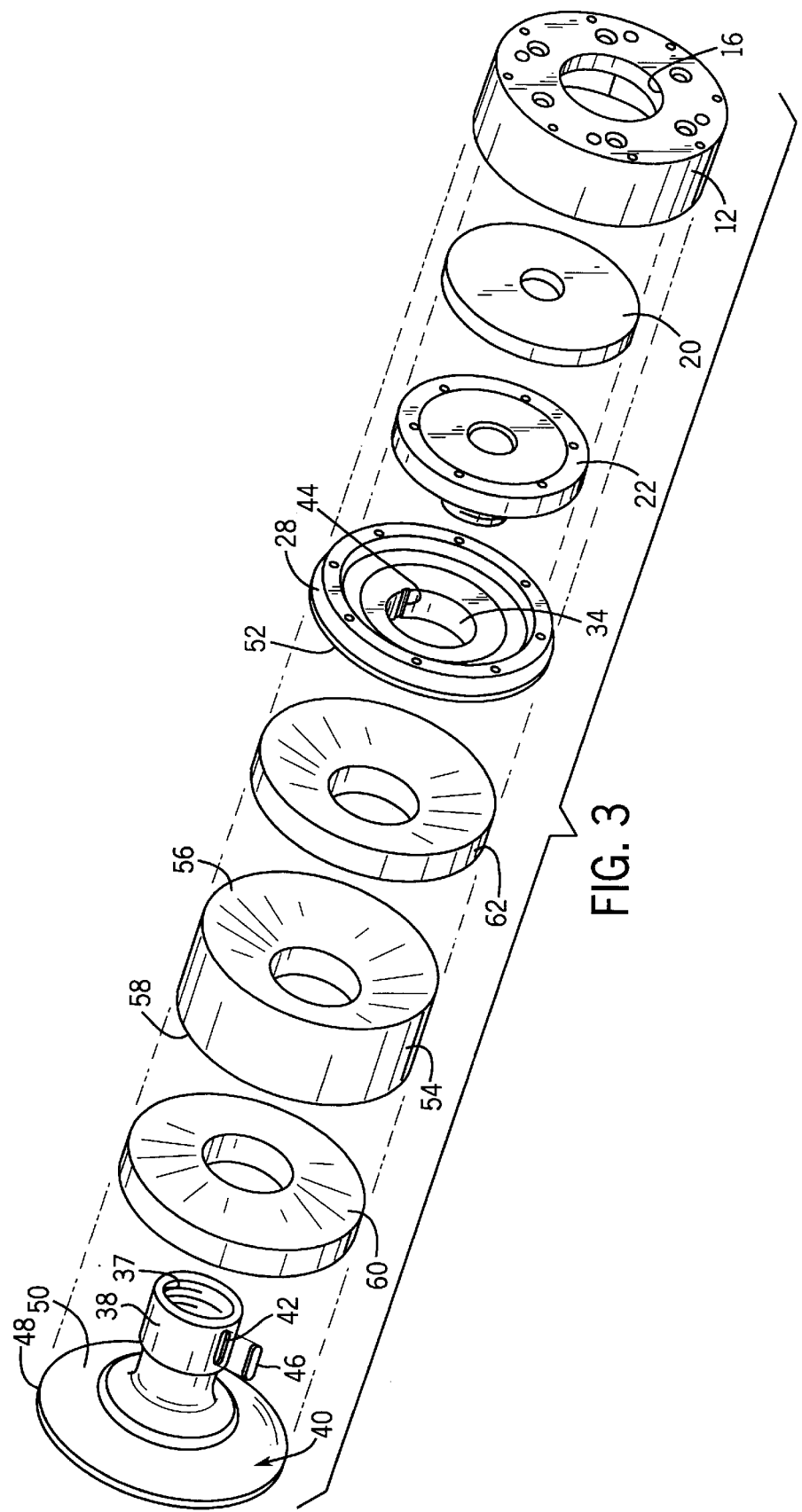
FIG. 3 is an exploded view of a subassembly in the vibration absorber.

With initial reference to FIGS. 1 and 2, a vibration absorber 10 has a housing 12 to which a direct current (DC) motor 14 is mounted on one side. The housing is cylindrical with a central aperture through which the shaft 18 of the motor 14 passes. The shaft 18 is connected to a harmonic drive 20 to which a crank 22 is attached by a plurality of bolts 24. The harmonic drive is a 100 to 1 geared reducer which rotates the crank 22 one revolution for every 100 revolutions of the motor shaft 18. The harmonic drive 20 and part of the crank 22 nest within a recess 26 in the other side of the housing 12 that it is remote from the side to which the motor 14 is attached. However, the harmonic drive 20 and the crank 22 are spaced from the housing 12 and are able to rotate within the recess about axis 33 when driven by the motor shaft 18. The assembly of components to which the motor 14 attaches also is shown in exploded format in FIG. 3.

A disk-shaped load plate 28 is attached by bolts 30 to the end of the housing 12 that is remote from the motor 14. A thrust bearing 32 is sandwiched between an annular flange of the crank 22 and the surface of the load plate 28. As will be described, the thrust bearing 32 allows the crank to rotate with respect to the load plate, while exerting axial force on the load plate. The load plate 28 has a central aperture 34 and a tubular projection 36 extends from a disk shaped portion of the crank 22 through that central aperture 34. The crank projection 36 has external screw threads which engage internal screw threads in an aperture 37 within a neck 38 of a mount 40. The external surface of the neck 38 has two diametrically opposed keyways 42 which align with the two diametrically opposed keyways 44 in the aperture 38 through the load plate 28. A pair of keys 46 are placed in the aligned keyways 42 and 44 to rotationally interlock the load plate 28 and the mount 40. Keyways 44 are slots which allow axial movement of the load plate 28 along the keys and thus with respect to the mount 40.

The mount 40 has a disk-shaped portion 48 from which the neck 38 extends. The major surface 50 of a disk-shaped portion which faces the load plate 28 is bevelled so that the outer edge of the major surface 50 is farther from the load plate 28 than the portion of the major surface contiguous with neck 38. Similarly, surface 52 of the load plate 28 which faces the mount 40 is bevelled so that the outer edge is farther from the mount 40 than the portion of the surface nearest the center of the load plate. The bevelled surfaces 50 and 52 of the disk-shaped elements 48 and 28 are truncated conical surfaces. As evident from the illustration in FIG. 2, the bevelled surfaces 50 and 52 of the mount 40 and load plate 28 form a generally V-shaped groove extending around the axis 33 of the vibration absorber 10.

A heavy annular tuning mass 54, made of tungsten, is located in the groove between the mount 40 and the load plate 32, and has a central round aperture through which the neck 38 of the mount freely extends. The end surfaces 56 and 58 of the tuning mass 54 taper inward toward the center so that the thickness of the tuning mass at the inside diameter is less than the thickness at the outside diameter. Specifically, the two end surfaces 56 and 58 are angled parallel to the respective bevelled surfaces 50 and 53, respectively, of the mount 40 and the load plate 28. A first elastomeric ring 60 is sandwiched between the bevelled surface 50 of mount 40 and end surface 56 of tuning mass 52. The surfaces of the first elastomeric ring 60 are parallel tapered, thus corresponding to tapering of the respective mating surfaces. An identical second elastomeric ring 62 is sandwiched between the bevelled surface 52 of load plate 28 and the other end surface 58 of tuning mass 54. For example, both elastomeric rings 60 and 62 may be made of rubber. During assembly of the vibration absorber 10, the tubular projection 36 of crank 22 is threaded into the aperture in neck 38 of the mount 40 so that the crank 22 exerts axial force through the thrust bearing 32 onto the load plate 28, thus compressing the two elastomeric rings 60 and 62 between the mount 40 and the load plate 28 against the tuning mass 52.

The remote side of the mount 40 from the neck 38 has a threaded mounting lug 65 which screws into an aperture in the structural member having vibrations to be absorbed. Apparatus 10 absorbs vibration occurring along axes that are orthogonal to the axis 33, as will be described.

A cup-shaped outer shell 64 extends around the motor and the edge of the mount 40 thereby enclosing components of the absorber 10. The shell is attached by a pair of pins 66 which press fit into holes in the housing 12. An electrical connector 68 is mounted on the shell 64 to provide connection to the internal electronics and other components of the vibration absorber 10.

The resiliency of the elastomeric rings 60 and 62 act as springs which permit the tuning mass 54 to oscillate orthogonal to the longitudinal axis 33 of the vibration absorber. Therefore vibration absorber 10 is mounted to the airframe so that its longitudinal axis 33 is perpendicular to the plane in which the vibrations to be absorbed occur. Because the elastomeric rings 60 and 62 are symmetrical about longitudinal axis 33, the vibration absorber reacts to vibrations which have components along two orthogonal axes that are perpendicular to longitudinal axis 33. The beveled interfaces of the elastomeric rings 60 and 62 with the tuning mass 54, mount 40 and load plate 28 produce both compressive and shear stress in the rings as the tuning mass oscillates. The tuning mass 54 oscillates at a resonant frequency which is a function of its mass and resiliency of the elastomeric rings 60 and 62, i.e. spring stiffness. When the resonant frequency matches the frequency of vibration of the airframe, optimal absorption of vibration energy by the tuning mass oscillation takes place.

The DC motor 14 is bi-directional enabling the crank 22 to be turned into and out of the neck 38 on the mount 40 thereby causing the load plate 28 and the mount to move toward and away from each other. As will be described, that movement alters the resiliency of elastomeric rings 60 and 62 and thus the stiffness of the spring formed by those rings. This enables the resonant frequency of the vibration absorber 10 to be tuned dynamically to different vibration frequencies in the aircraft structure and compensates for tuning shifts due to age and temperature changes.

Figure 4:
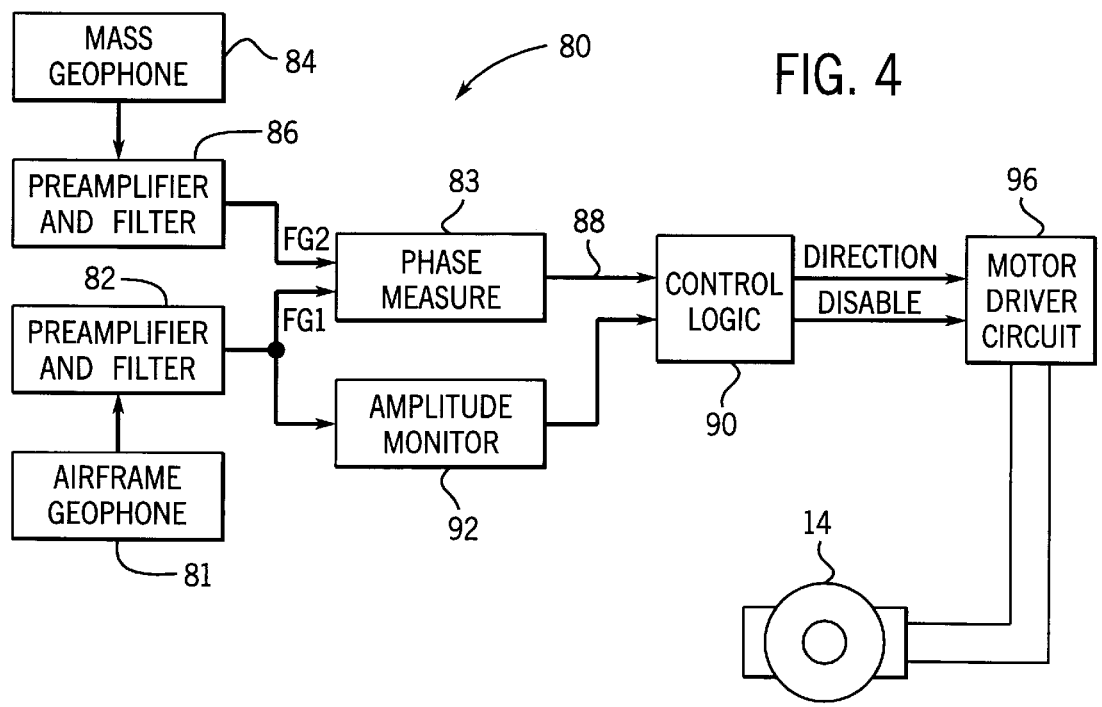
FIG. 4 is a block schematic diagram of a control circuit for sensing airframe vibrations and adjusting the resonant frequency of the vibration absorber.

With reference to FIG. 4, the spring stiffness for the vibration absorber 10 is varied by a control circuit 80 in response to the sensed structural vibrations in the airframe. An airframe geophone 81, such as a model GS14-L9 manufactured by Geospace Corporation of Houston, Tex., USA, is attached to the mount 40 to sense vibration of the airframe occurring in a plane perpendicular to axis 33 (FIG. 2). Alternatively, the airframe geophone 81 can be placed directly on the airframe member to which the mount is attached. The geophone has a resonance close to 28 Hz and acts as a velocity sensor above that resonant frequency, i.e. in the vibration frequency range. The output signal from the airframe geophone 81, representing the structural vibration, is applied to an input of a first preamplifier and filter circuit 64 which extracts the signal at the excitation frequency of the geophone and converts the extracted signal into a square wave. This square wave signal FG1 produced by the first preamplifier and filter circuit 64 is applied to one input of a phase measure circuit 83.

Another geophone 84 is attached to the tuning mass 54, as shown in FIG. 2, to sense the vibration of the absorber tuning mass orthogonally to axis 33. Accelerometers could be used in place of the two geophones 81 and 84. The output signal from mass geophone 84 is fed to a second preamplifier and filter circuit 86 which extracts the signal at the excitation frequency of the mass geophone and converts the resultant signal into a square wave. That square wave signal FG2 from the second preamplifier and filter circuit 86 is applied to another input of the phase measure circuit 83.

The phase measure circuit 83 determines the phase difference between the two filtered geophones signals FG1 and FG2. When the resonant frequency of the vibration absorber 10 matches the frequency of the airframe vibration, the two geophone signals are in quadrature, or ninety degrees out of phase. At that time, phase measure circuit 83 produces an output voltage level $V_{90}$ indicative of the quadrature relationship; for example, the $V_{90}$ level may equal one-half the supply voltage to the phase measure circuit. The phase shift of the two geophone signals from quadrature results in deviation of the phase measure circuit output voltage from the quadrature voltage level $V_{90}$. The amount of deviation indicates the magnitude of the out of quadrature phase difference and the deviation direction indicates the direction of phase shift between the two geophone signals.

The output from the phase measure circuit 83 is applied via line 88 to a control logic circuit 90. However, due to an RC network which integrates the phase relationship signal in the phase measure circuit, the output signal may have a slight ripple. To avoid erroneous adjustment of the absorber's resonant frequency, control logic circuit 90 contains a window comparator which defines a voltage range, e.g. two volts, centered about the quadrature voltage level $V_{90}$. When the phase measure circuit's output voltage is inside this two volt range, the control logic 90 produces a true DISABLE signal, otherwise a false DISABLE signal is produced. As will be described, a true DISABLE signal inhibits operation of the DC motor 14 and thus alteration of the spring stiffness for the vibration absorber. Therefore, when the geophone signals deviate significantly from quadrature, the signal on line 88 will be outside the two volt range resulting in activation of the DC motor 14.

The control logic 90 also produces a true DISABLE signal in response to a signal from an amplitude monitor 92 which receives the filtered airframe geophone signal FG1. The amplitude monitor output results in a true DISABLE signal when the signal from the airframe geophone 81 is too small to provide reliable tuning of the vibration absorber 10.

The control logic 90 also responds to the direction of the phase shift between the two geophone signals by producing a DIRECTION signal that indicates in which direction the DC motor 14 should be operated to tune the vibration absorber.

When the resonant frequency of the vibration absorber 10 is properly tuned to the frequency of airframe vibration, the signals from the geophones 81 and 84 are in quadrature. This signal state causes the control circuit 80 to produce a true DISABLE signal which inhibits the motor driver 96 from operating the motor 14. When the vibration absorber 10 is not properly tuned, the signals from the airframe and tuning mass geophones 81 and 84 will be out of quadrature. This condition results in the phase measure circuit output signal being outside the two volt range set by the window comparator in the control logic 90. As a consequence, the control logic 90 produces a false DISABLE signal which causes the motor driver 84 to produce a drive signal for the DC motor 14. That drive signal causes the motor to move in the direction specified by the DIRECTION signal from the control logic 90.

Referring to FIG. 2, the shaft 18 of motor 14 is coupled via the 100 to 1 harmonic drive 20 to the crank 22. As the motor shaft turns, the threaded projection 36 on the crank screws into or out of the neck 38 on the mount 40. This action draws the crank 22 toward or away from the mount along the longitudinal axis 33. This movement of the crank 22 applies force to the load plate 28 through thrust bearings 32 which enables the crank to rotate without turning the load plate. Movement of the load plate 28 toward the mount 40 increases compression of the two elastomeric rings 60 and 62, while movement of the load plate away from mount 40 decreases that compression.

Altering the compression of the elastomeric rings 60 and 62 changes the stiffness of the spring formed by those rings which in turn varies the resonant frequency of the vibration absorber 10. The compression is altered until the resonant frequency is tuned to the frequency of vibration in the airframe structural member to which the vibration absorber 10 is attached. When that tuning match occurs, the geophone signals are in quadrature causing the control circuit 80 to produce a true DISABLE signal thereby terminating operation of the motor 14.

In this manner, the resonant frequency of the vibration absorber 10 is changed to track variations in vibration frequency which result from changes in the aircraft engine speed. Adjustment of the absorber tuning also occurs to compensate for effects due to temperature changes and aging of the elastomeric material.

We claim:

1. A vibration absorber comprising:
   a mount that attaches to a vibrating body;
   a mass;
   a spring coupling said mass to said mount so that said mass can vibrate with respect to said mount, and having a stiffness which defines a resonant frequency at which said mass vibrates;
   a mechanism which adjusts the stiffness of said spring in response to a control signal and thereby alters the resonant frequency;
   a first sensor which produces a signal indicating vibration of the body; and
   a control circuit which receives the signal from said first sensor and produces the control signal causing said mechanism to adjust the stiffness of said spring so that said spring and said mass resonate to reduce vibration of the body.

2. The vibration absorber as recited in claim 1 wherein said mechanism variably compresses said spring.

3. The vibration absorber as recited in claim 1 wherein said spring is formed of elastomeric material.

4. The vibration absorber as recited in claim 1 wherein said mechanism comprises:
   a load plate adjacent to said mount; and
   a drive assembly which moves said load plate toward and away from said mount.

5. The vibration absorber as recited in claim 4 wherein:
   said mass is located between said mount and said load plate; and
   said spring comprises a first body of elastomeric material between said mass and said mount, and a second body of elastomeric material between said mass and said load plate.

6. The vibration absorber as recited in claim 5 wherein said mechanism further comprises:
   a crank having a threaded member which engages screw threads on a portion of said mount, and coupled to said load plate to apply force which causes said load plate to move toward and away from said mount;
   a motor having a frame and a shaft which is coupled to said crank to produce rotation of said crank; and
   a coupling which connects the frame of said motor to said load plate.

7. The vibration absorber as recited in claim 1 wherein said mount has a stud with screw threads for attaching to the vibrating body.

8. The vibration absorber as recited in claim 1 further comprising a second sensor which produces a signal indicating vibration of said mass; and wherein said control circuit also produces the control signal in response to the signal from said second sensor.

9. A vibration absorber comprising:
   a mount for attachment to a vibrating body and having a neck with screw threads thereon;
   a crank having a threaded member which engages the screw threads on the neck of said mount;
   a motor having a motor frame and a shaft which is coupled to said crank to produce rotation of said crank;
   a load plate with an aperture through which extends at least one of the threaded member of said crank and the neck of said mount, said load plate being coupled to said crank which causes movement of said load plate toward and away from said mount;
   a coupling attaching the motor frame to said load plate;
   a mass located between said mount and said load plate, and having an aperture through which extends at least one of the threaded member of said crank and the neck of said mount;
   a first ring of elastomeric material between said mass and said mount; and
   a second ring of elastomeric material between said mass and said load plate, wherein said first and second rings act as a spring which defines a resonant frequency at which said mass vibrates.

10. The vibration absorber as recited in claim 9 further comprising:

a first sensor which produces a signal indicating vibration of the body; and a control circuit which receives the signal from said sensor and controls application of power to said motor which produces movement of said load plate with respect to said mount, thereby varying compression of said first and second rings and the resonant frequency.

11. The vibration absorber as recited in claim 10 further comprising a second sensor which produces a signal indicating vibration of said mass; and wherein said control circuit also produces the control signal in response to the signal from said first sensor.

12. The vibration absorber as recited in claim 9 wherein said crank is coupled to said load plate by a thrust bearing.

13. The vibration absorber as recited in claim 9 wherein the neck of said mount has a first keyway, the aperture of said load plate has a second keyway, and further comprising a key in both the first and second keyways which prevents rotational movement between said load plate and said mount while permitting linear movement therebetween.

14. The vibration absorber as recited in claim 9 wherein said mount has a first annular surface which faces said load plate; and said load plate has a second surface which faces the first surface of said mount; wherein the first and second annular surfaces are angled to form a generally V-shaped, annular groove between said mount and said load plate, with a combination of said first ring, said second ring and said mass being located within the V-shaped, annular groove and abutting the first and second annular surfaces.

15. The vibration absorber as recited in claim 14 wherein said mass is annular with the aperture at a center and having opposite end walls tapering inward so that a distance between said end walls decreases going toward the center.

16. The vibration absorber as recited in claim 15 wherein each of said first ring and said second ring has a first end surface bevelled to match a taper of an end walls of said mass and a second end surface bevelled to match an angle of one of the first and second annular surfaces.

* * * * *